(Model.)
3 Sheets—Sheet 1.
J. F. SEIBERLING.
SELF BINDING HARVESTER.
No. 269,333.
Patented Dec. 19, 1882.
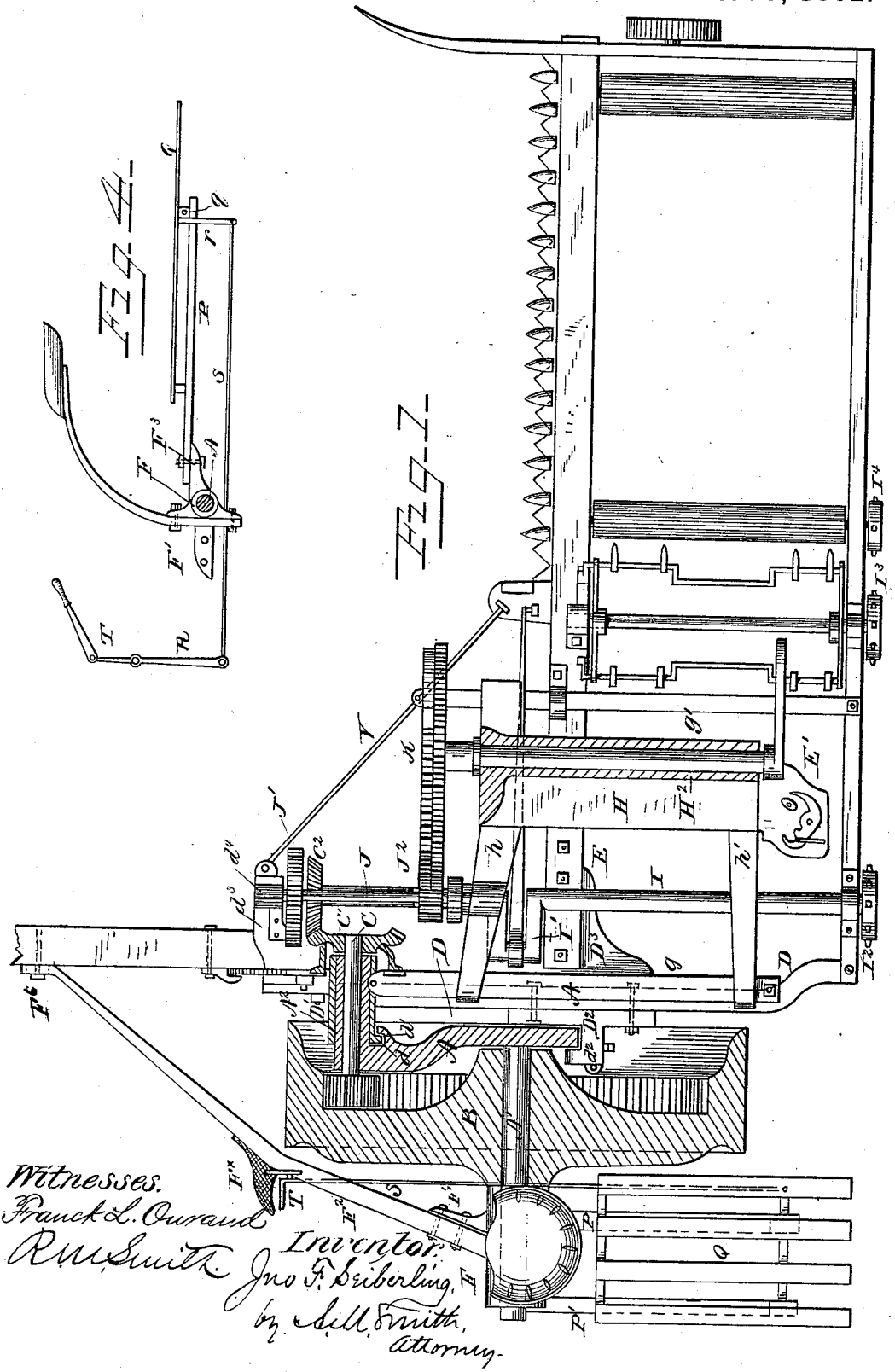
Witnesses.
Franck L. Ourand
R. M. Smith
Inventor.
Jno. F. Seiberling,
by Sill Smith,
Attorney.

(Model.)
J. F. SEIBERLING.
SELF BINDING HARVESTER.
No. 269,333.   Patented Dec. 19, 1882.
3 Sheets—Sheet 2.
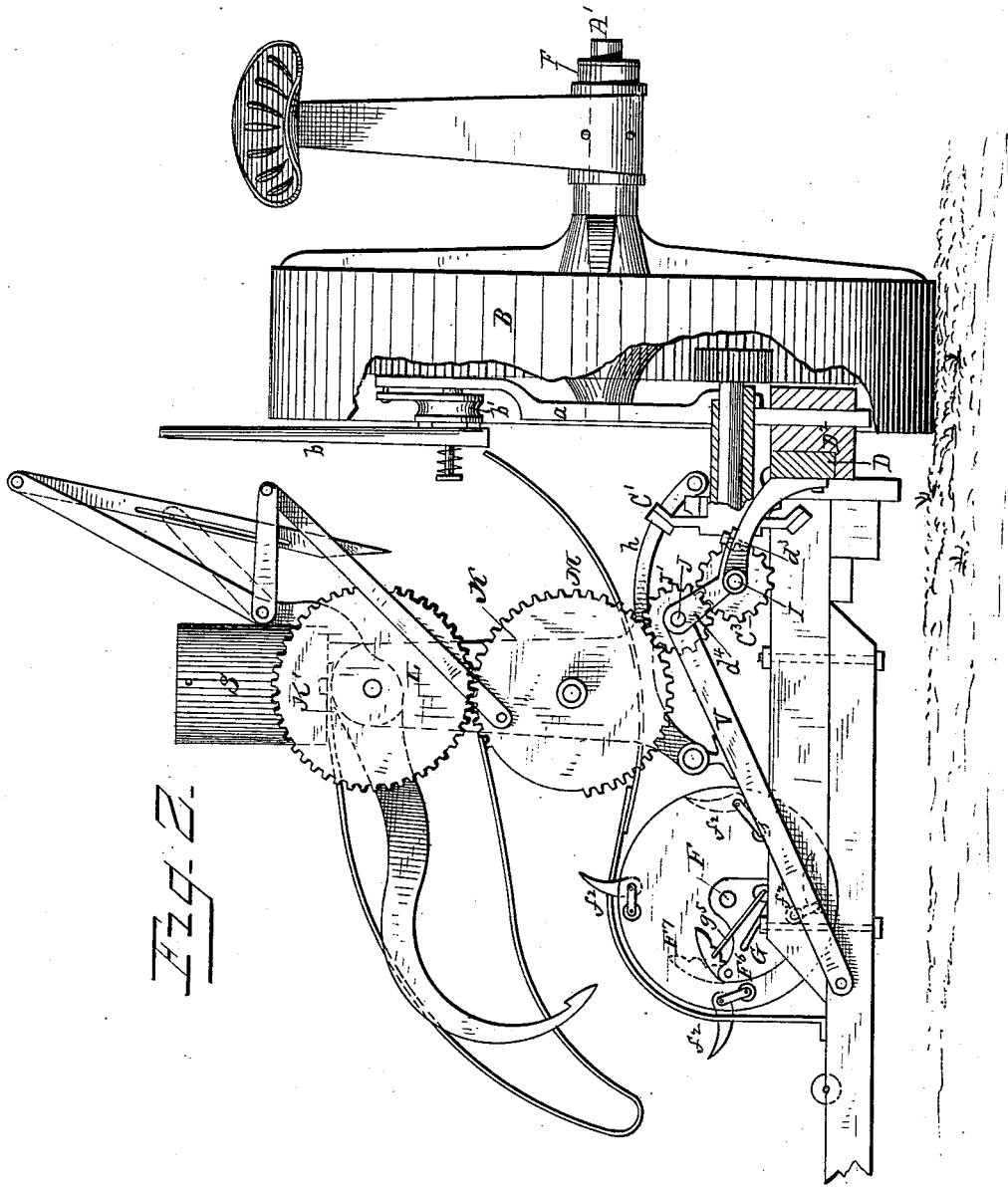
Witnesses.
Franck L. Durand
R. M. Smith
Inventor.
Jno. F. Seiberling.
by A. M. Smith.
Attorney (Model.)
J. F. SEIBERLING.
SELF BINDING HARVESTER.
No. 269,333. Patented Dec. 19, 1882.
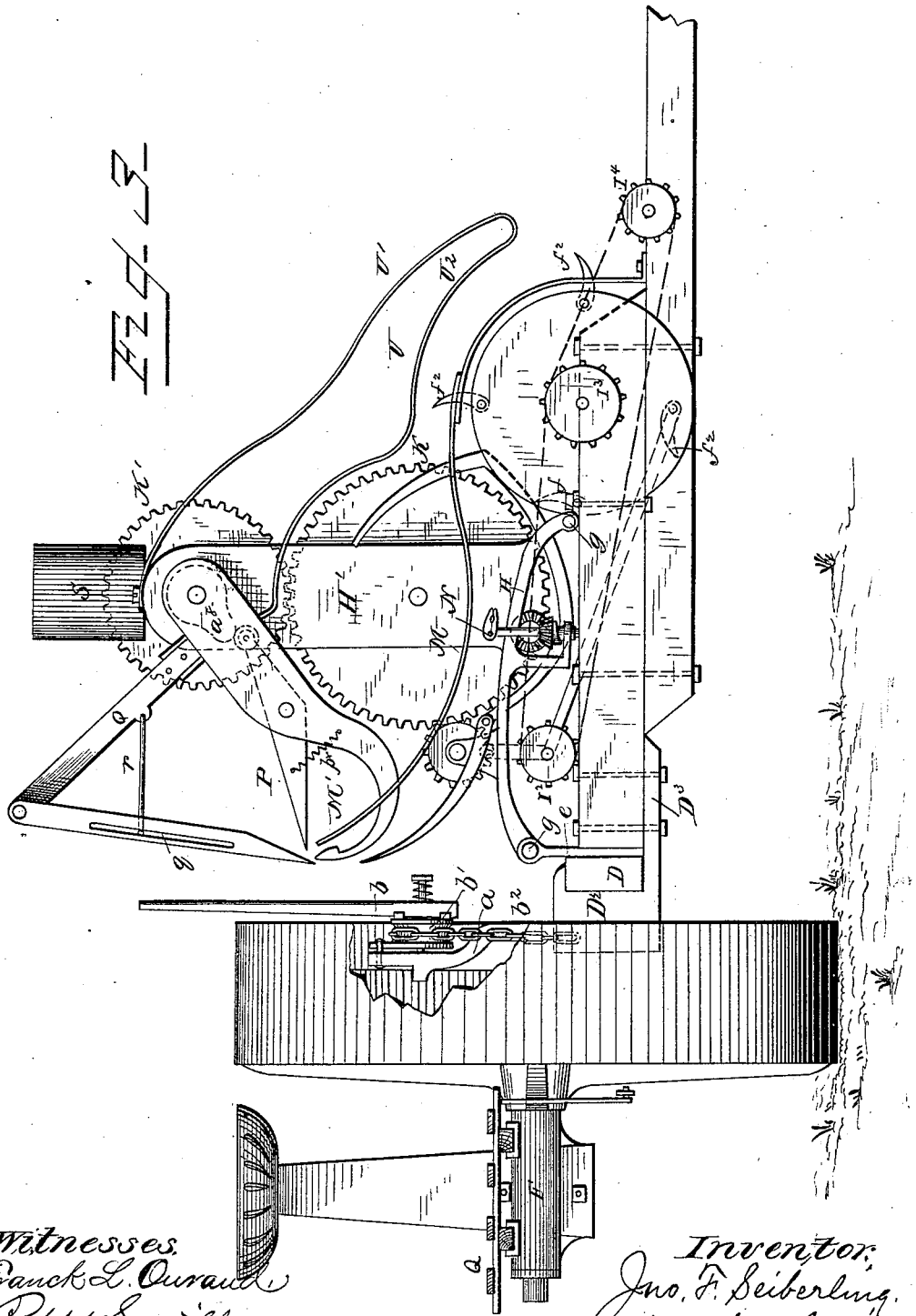
Witnesses,
Franck L. Ourand
R. M. Smith
Inventor,
Jno. F. Seiberling.
by A. M. Smith,
Attorney.

UNITED STATES PATENT OFFICE.

JOHN F. SEIBERLING, OF AKRON, OHIO.

SELF-BINDING HARVESTER.

SPECIFICATION forming part of Letters Patent No. 269,333, dated December 19, 1882.

Application filed April 3, 1882. (Model.)

*To all whom it may concern:*

Be it known that I, JOHN F. SEIBERLING, of Akron, county of Summit, State of Ohio, have invented new and useful Improvements in Self-Binding Harvesters, of which the following is a full, clear, and exact description, reference being had to the accompanying drawings, making part of this specification, in which—
Figure 1 is a plan or top view, partly in section, of a harvesting-machine with my improvements applied. Fig. 2 is a front elevation of the same, also partly in section and partly broken away. Fig. 3 is a rear elevation with the driving-wheel partly broken away, and Fig. 4 is a side elevation of the bundle-carrier and the means for tilting the same.

My invention relates to a novel construction of the main gearing-support, and to a novel arrangement of the binder-frame in connection therewith; to a novel arrangement of the binder mechanism and driver's seat relative to each other and to the main drive-wheel; to a novel arrangement of gearing for communicating motion from the harvester to the binder mechanism; to a novel arrangement of bundle-carrier, and to the arrangement of means for tilting or dumping the same, as hereinafter explained.

In the accompanying drawings, A represents a casting forming the main gear-support, provided on one side, near one end, with a laterally-projecting axle, A', formed upon or rigidly secured to it, upon which the main drive-wheel B is mounted, and near its opposite end, upon the opposite side, also provided with a sleeve, A², forming a journal-box for the pinion-shaft C rotating therein. The driving-wheel is provided with an internally-cogged rim, from which motion is imparted to the pinion-shaft through a pinion on the outer end of said shaft, and the latter is provided on its inner end with a bevel-wheel, C', from which motion is imparted to the crank-shaft, and thence to the cutter and binder mechanisms, as will be explained.

D is a longitudinal harvester frame-bar, provided near its forward end with a standard or upright, having on its upper end perforated ears or a sleeve, D', surrounding the sleeve A² of the gear-support A, and provided on its end adjacent to said support with a segmental flange, $d$, with which a hook-shaped lip, $d'$, formed on the gear-support A engages, said hook overhanging the flange $d$ when the support A and frame D are in working relation to each other, and preventing relative lateral movement of said gear-support and machine-frames. The pole or tongue is hinged to the forward end of the frame-bar D in advance of the sleeve D', and said bar is provided near midway of its length with a bracket, D², having on its side adjacent to the gear-support A a grooved or hook-shaped flange, $d^2$, engaging with and sliding up and down upon the expanded heel-extension A³ of the gear-support beyond the axle A'. By this arrangement of gear-support and harvester frame-bar, the former is adapted to vibrate or be adjusted at its swinging end with the axle A' as a center of movement for raising and lowering the forward end of frame-bar D, and the latter is adapted to be adjusted around the pinion-shaft as a center for adjusting the height and angle of relation of said bar and its attachments to the ground.

The bracket D² has a laterally-projecting arm, D³, formed on its lower end, and to this arm and the rear end of frame-bar D the laterally-projecting frame-timbers E and E' are secured, forming the supports for the finger-bar and the rear bar of the platform-frame, the former arranged nearly in the same vertical plane with the axle A' transversely of the machine, but by preference slightly in rear thereof, as shown, for a purpose hereinafter explained.

The gear-support A is provided with a standard, $a$, in the upper end of which is pivoted a lever, $b$, provided with a sheave or grooved quadrant, $b'$, from which a chain, $b^2$, extends down to and is connected with the bracket D², for facilitating the adjustment of the frame-bar D and the cutting apparatus and platform-frame attached thereto, any suitable means being employed for holding the lever $b$ at the desired adjustment.

Upon the axle A', outside of the wheel B, is mounted a sleeve or thimble, F, secured thereon by a suitable washer and pin or nut, and provided with a suitable arm or support for the driver's seat, mounted thereon, and on its forward face with an arm, F', from which a brace-rod, F², extends forward, crossing obliquely in front of the driving-wheel to the hinged pole or tongue, with which it has a sliding connection, F⁶, at its forward end, made in any suitable manner, for permitting the necessary adjustments of the tongue, while serving to hold the thimble F and the driver's seat connected therewith in the position required. The brace F² is provided with a rest or stirrup, Fˣ, for the driver's feet.

The frame-bar D and the transverse timbers or bars E and E' are provided at e with suitable uprights, to the upper ends of which are secured two longitudinal rods or bars, g g', affording a support for a longitudinally-sliding binder-frame. This frame is composed of two transverse bars, h and h', having sleeves on their ends, which surround and slide on the rods g and g', said transverse portions being rigidly connected by and by preference cast in one piece with a longitudinal bar, H. This sliding binder-frame has a standard, H', said standard being provided on its upper end with a rearwardly-projecting sleeve, H², having suitable bearings for the shaft L, carrying the binder needle-arm.

To the forward end of the frame-bar D a bracket, d³, is secured, in the upper end of which the forward end of crank-shaft I has its bearing, said shaft extending longitudinally over the bars E and E', and being provided with a bearing at its rear end on the latter bar. This shaft is provided with a crank, I', arranged near about in line with the main axle, for imparting motion to the sickle-bar, and on its rear end with a sprocket-wheel, I², from which motion is imparted to the platform apron roller and to the elevating and packing mechanism at the inner end of said apron through suitable sprocket-wheels, I³ and I⁴. Motion is imparted to the crank-shaft I through a bevel-wheel, C², thereon, engaging with the bevel-wheel C' on the pinion-shaft.

Above the crank-shaft I is another longitudinal shaft, J, mounted at its forward end in a removable extension, d⁴, of the bracket d³, and at its rear end in a bearing on the forward transverse bar, h, of the sliding binder-frame. The shaft J is provided with a spur-gear, J', which receives motion from a similar gear on the crank-shaft. The shaft J has a spur-gear, J², feathered to and sliding upon its rear end adjacent to the binder-frame H, and coupled to said frame in any suitable manner, adapting it to slide with said frame as the latter is adjusted back and forth to accommodate its position to the length of straw to be operated upon.

K and K' are spur-gears, mounted the former on a stud-axle on the forward face of the standard H', and engaging with and receiving motion from the sliding gear J², and imparting motion to the gear K' on the shaft L, carrying the needle-arm. The wheel K is provided in its rear face with suitable cam-grooves for actuating the knotting mechanism; but as the binding mechanism is made the subject of a separate application, it need not be described in detail here.

By the construction described the sliding binder-frame, upon which the binder mechanism is mounted, is brought close up to the inner or grain side of the driving-wheel B, and by reference to the drawings it will be seen that said frame and mechanism are arranged above the horizontal plane of the pitman, actuating the sickle-bar crossing the vertical plane of said pitman and of the cutting apparatus and main drive-wheel axle and between the cutting apparatus or grain-platform and the driving-wheel, while the driver's seat is arranged over the axle on the opposite side of said drive-wheel, this arrangement serving to give the machine a compact form, utilizing the weight of the driver to counterbalance in part the weight of the binding mechanism upon the grain-wheel, and the consequent drag of the latter, and also to equalize as nearly as practicable the weight upon the axle in front and in rear thereof, thereby facilitating the rocking of the machine thereon.

By the arrangement of the cutters about in the same vertical plane with the axle transversely of the machine, or slightly in rear thereof, as shown, the grain is deposited upon the platform in rear of said plane, and, being moved inward by the carrying apron or other suitable raking device, is carried by an elevating-drum, described in the other application referred to, up to and is deposited upon a binding-table, M, arranged above the binder-frame H and in rear of the vertical plane of the drive-wheel axle. This table, between the knotting devices indicated at N, Fig. 3, and the driving-wheel, is inclined or curved upward, as shown at M', adapting the bundle, after it has left the knotting devices, to be carried up over the rear portion of said wheel, any suitable mechanism being employed for that purpose, that shown being described in the other application referred to.

The seat-supporting sleeve or thimble F is shown provided with horizontal arms F³, to which rearwardly-projecting bars P P' are secured, forming a support for a bundle-carrier, Q, connected by a transverse pivot at q with the rear ends of bars P P'. This bundle-carrier may be made in any suitable form, preferably of parallel longitudinal slats, connected by transverse bars, as shown, for making it as light as practicable, and may be made concave or provided with narrow upright side strips for adapting it to retain the bundles thrown upon it. Its transverse shaft is provided with a pendent crank-arm, r, from which a connecting-rod, s, extends forward to a crank arm or lever, R, pivoted in the tongue-brace F², and connected at its upper end with a treadle, T, arranged within convenient reach of the driver's foot, the arrangement being such that the driver, by pressing his foot upon the treadle T, can at any time tilt the bundle-carrier for discharging its load. This bundle-carrier is arranged directly behind the driver, in rear of the axle, and on the opposite side of the driving-wheel from the binder-table, in position to receive the bundles discharged from the latter over the rear portion of the driving-wheel, and within convenient reach of the driver, who is thus enabled to insure the proper delivery of the bundles to and the proper arrangement of the latter upon the carrier until the desired number has accumulated or the desired point of discharge has been reached, when by tilting the carrier they are deposited upon the ground behind the driver, and out of the way of the team and machine on the succeeding round.

V is a brace extending from the inner shoe of the cutting apparatus obliquely forward to the bracket $d^3$, or other convenient point of support on the frame. One of the supports for the rod $g'$ is represented as secured to this brace, thereby securing a support in advance of the line of the cutters, and gives more room for the adjustment of the binder-frame.

Parts of the machine not particularly described may be constructed in any usual or preferred manner.

Having now described my invention, I claim—

1. The combination, in a grain-binding harvester, of the main supporting and driving wheel, the driver's seat, located on the axle on the outer side of said wheel, a dumping bundle-carrier supported upon said axle in rear of the driver's seat, a cutting apparatus located centrally of the driving-wheel, on the opposite side from the driver's seat, and a binding mechanism located on the platform side of said wheel, substantially as and for the purpose described.

2. The combination of the driver's seat with the thimble-support on the outer end of the main axle, the supporting-brace having a sliding connection with the tongue of the machine, and the foot-rest on said brace, substantially as described.

3. The gear-support A, provided with the main drive-wheel axle, projecting from its side near one end, and a sleeve-bearing for the secondary shaft, projecting on the opposite side near the other end, in combination with the harvester frame-bar D, provided with the sleeve D', and hook-bracket $D^2$, arranged and operating substantially as described.

4. The combination of the gear-support A, provided with the drive-wheel axle A', and pinion-shaft sleeve $A^2$, the harvester frame-bar D, provided with the sleeve D', and hook-bracket $D^2$, and the lifting-lever mounted on the gear-support and connected by chain with the hook-bracket $D^2$, substantially as described.

5. The rib or flange $d$ on the harvester-frame thimble D', in combination with the hook $d'$ on the gear-support A, for keeping said thimble in place, substantially as described.

6. The combination of the crank-shaft I, the spur-pinion $C^3$, the shaft J, and the spur-wheel J', and sliding pinion $J^2$ thereon, for transmitting motion from the harvester to the binding mechanism, substantially as described.

7. The combination, in a grain-binding harvester, of a binding mechanism located on the platform side of the driving-wheel, a driver's seat located over the axle on the opposite side of said wheel, and a dumping bundle-carrier located behind said driver's seat, on the same side of the driving-wheel therewith, said seat and bundle-carrier being both connected with and supported upon the outer end of the drive-wheel axle, substantially as described.

8. In a grain-binding harvester, the combination of a binding mechanism located on the platform side of the driving-wheel, between the platform and said wheel, a driver's seat supported on the main drive-wheel axle, on the opposite side of said wheel to said binding mechanism, and a tilting bundle-carrier located behind said seat and connected by a transverse pivot with arms attached to the seat-supporting thimble, substantially as described.

9. The tilting bundle-carrier Q, secured to a transverse pivot mounted in arms attached to the seat-supporting thimble, in combination with the treadle P', the connecting-rod R', and the levers or cranks for operating the same, substantially as described.

In testimony whereof I have hereunto set my hand this 27th day of March, A. D. 1882.

JOHN F. SEIBERLING.

Witnesses:
 FRANK A. SEIBERLING,
 H. M. HOUSER.